United States Patent [19]

Masuda et al.

[11] Patent Number: 5,698,628
[45] Date of Patent: Dec. 16, 1997

[54] RESIN COMPOSITION SUITABLE AS WATER-BASED PAINT AND PROCESS FOR FORMING COATING FILMS HAVING EXCELLENT STAIN RESISTANCE

[75] Inventors: Toshiyuki Masuda, Takasago; Akira Kusumi, Kakogawa; Naotami Ando, Hyogo, all of Japan

[73] Assignee: Kanegafuchi Kagaku Kogyo Kabushiki Kaisha, Osaka, Japan

[21] Appl. No.: 727,485

[22] PCT Filed: Feb. 26, 1996

[86] PCT No.: PCT/JP96/00451

§ 371 Date: Oct. 24, 1996

§ 102(e) Date: Oct. 24, 1996

[87] PCT Pub. No.: WO96/26988

PCT Pub. Date: Sep. 6, 1996

[30] Foreign Application Priority Data

Feb. 27, 1995 [JP] Japan ................................. 7-38408

[51] Int. Cl.[6] .................................................. C08L 43/04
[52] U.S. Cl. ........................... 524/806; 524/457; 526/279
[58] Field of Search ................................. 524/806, 457; 526/279

[56] References Cited

U.S. PATENT DOCUMENTS

| 5,100,955 | 3/1992 | Pons et al. | 524/806 |
| 5,322,890 | 6/1994 | Ando et al. | 524/806 |

FOREIGN PATENT DOCUMENTS

| 61-7360 | 1/1986 | Japan . |
| 64-51468 | 2/1989 | Japan . |
| 5-331408 | 12/1993 | Japan . |

*Primary Examiner*—Melvyn I. Marquis
*Attorney, Agent, or Firm*—Varndell Legal Group

[57] ABSTRACT

A resin composition suitable as water-based paints which comprises 100 parts by weight of an emulsion of a polymer obtained by copolymerizing a silyl group-containing vinyl monomer with other vinyl monomers, 1 to 70 parts by weight of a silicon compound and/or its partial hydrolysis condensation product and/or a silicon compound having at least one amino group and/or its derivative and at least one hydrolyzable silyl group in one molecule, and 0 to 20 parts by weight of a curing catalyst. When the resin composition is coated onto materials to be coated, coating films having an excellent stain resistance in addition to excellent weatherability and durability are formed on the sufaces of the materials to be coated.

8 Claims, No Drawings

RESIN COMPOSITION SUITABLE AS WATER-BASED PAINT AND PROCESS FOR FORMING COATING FILMS HAVING EXCELLENT STAIN RESISTANCE

TECHNICAL FIELD

The present invention relates to a resin composition suitable as a water-based paint which has good film performances, for example, in interior and exterior coating of buildings and coating of various articles such as automobiles, household electric appliances, plastic goods and others, particularly in uses requiring weatherability and durability.

BACKGROUND ART

In the fields of paints and adhesives, conversion of organic solvent-based systems to non-solvent systems using water-soluble or water-dispersible resins or powder resins has been attempted from the viewpoints of anti-pollution measure or resource saving. In the field of paints, the conversion to water-based paints has been earnestly made rather than powder coating. However, conventional aqueous resins have the disadvantage that since they have no crosslinkable functional group in the molecules, they are subject to a strong influence of surface active agents used in the polymerization to remarkably deteriorate the weatherability, water resistance and stain resistance of the formed coating films and, therefore, are inferior in film performances as compared with solvent-based paints.

Various proposals have been made in order to improve the above disadvantage. For example, it is proposed to apply an emulsion of a polymer having a hydrolyzable silyl group as a crosslinkable functional group to water-based paints (cf. Japanese Patent Publication Kokai No. 3-227312). There is proposed an aqueous emulsion paint which can form crosslinkages between polymer particles by a reaction of carboxyl group and hydrazyl group (cf. Japanese Patent Publication Kokai No. 5-59305). There is also proposed a water-dispersion type fluororesin paint wherein a fluororesin which exhibits high performances in solvent systems, is made water-dispersible (cf. Japanese Patent Publication Kokai No. 5-25421).

In these paints, some degree of improvement is achieved with respect to weatherability and water resistance. However, adoption of aqueous system raises new problems, and the proposed paints are still unsatisfactory.

Also, known water-based paints are considerably inferior in stain resistance as compared with solvent-based paints. Recently, the stain resistance is increasingly demanded in various fields and, therefore, the stain resistance on a level close to that of solvent-based paints of low staining type is demanded for water-based paints, too.

As a result of making an intensive study in order to solve these problems, the present inventors have found at last that coating films having an excellent stain resistance which has not been able to be achieved by conventional water-based paints, as well as excellent weatherability and water resistance can be formed by mixing various kinds of water-based paint compositions or aqueous resin compositions with a tetra(tri)alkoxysilane and/or its partial hydrolysis condensate, and/or a silicon compound having at least one amino group and/or its derivative and at least one hydrolyzable silyl group in a molecule, in a specific ratio, and also mixing the compositions with a curing catalyst in a specific ratio. Thus, the present inventors have accomplished the present invention.

DISCLOSURE OF THE INVENTION

That is to say, the present invention relates to a resin composition suitable as water-based paints, which comprises:

(A) 100 parts by weight of an emulsion of a polymer obtained by copolymerizing a vinyl monomer containing a silyl group of the formula (I):

wherein $R^1$ is the same or different and each is an alkyl group having 1 to 10 carbon atoms, an aryl group having 6 to 10 carbon atoms or an aralkyl group having 7 to 10 carbon atoms, $X^1$ is at least one group selected from the group consisting of a halogen atom, an alkoxyl group, a hydroxyl group, an acyloxy group, an aminooxy group, a phenoxy group, a thioalkoxy group and an amino group, and a is an integer of 0 to 2, with other vinyl monomer, 1 to 70 parts by weight of (B) a silicon compound of the formula (II):

wherein $R^2$ is the same or different and each is an alkyl group having 1 to 10 carbon atoms, an aryl group having 6 to 10 carbon atoms or an aralkyl group having 7 to 10 carbon atoms, $R^3$ is the same or different and each is an alkyl group having 1 to 10 carbon atoms, an aryl group having 6 to 10 carbon atoms, an aralkyl group having 7 to 10 carbon atoms or an alkoxyl group having 1 to 10 carbon atoms, and b is an integer of 0 to 2, and/or its partial hydrolysis condensation product, and/or (C) a silicon compound having at least one amino group and/or its derivative and at least one hydrolyzable silyl group in a molecule, and (D) 0 to 20 parts by weight of a curing catalyst.

The present invention also relates to a process for forming a film having an excellent stain resistance, characterized by incorporating, into (A) 100 parts by weight of an emulsion of a polymer obtained by copolymerizing the viyl monomer having a silyl group of the formula (I) with other vinyl monomer, 1 to 70 parts by weight of (B) the silicon compound (II) and/or its partial hydrolysis condensation product and/or (C) the silicon compound having at least one amino group and/or its derivative and at least one hydrolyzable silyl group in a molecule, and (D) 0 to 20 parts by weight of a curing catalyst, and applying the resultant to a material to be coated.

BEST MODE FOR CARRYING OUT THE INVENTION

The polymers having a silyl group of the formula (I) [thereinafter referred to as "polymer (A)"] for obtaining the emulsions (A) used in the present invention are not particularly limited. The polymers (A) include, for instance, epoxy resins, polyester resins, polyether resins, acrylic resins, fluorine-containing resins, and the like, which have the silyl group of the formula (I). Among them, acrylic resins, urethane resins and fluorine-containing resins are preferred from the viewpoints that the coating films formed from the obtained curable resin compositions are excellent in weatherability and chemical resistance and the design of resins is possible within a wide range. Acrylic resins are more preferred from the viewpoint of low cost.

Processes for preparing the polymer (A) are not particularly limited. For example, from the viewpoint that the polymer (A) can be easily obtained, preferred is a process wherein the vinyl monomer containing the silyl group of the formula (I) [hereinafter referred to as "monomer (a-1)"] and other vinyl monomers copolymerizable therewith [hereinafter referred to as "monomer (a-2)"] are polymerized.

Examples of the monomer (a-1) are, for instance, a compound of the formula (III):

$$CH_2=\overset{R^4}{\underset{|}{C}}-\overset{R^1_a}{\underset{|}{Si}}-X^2_{3-a} \qquad (III)$$

wherein $R^1$ and a are as defined above, $R^4$ is hydrogen atom or methyl group, and $X^2$ is a halogen atom, e.g., $CH_2=CHSiCl_3$, $CH_2=CHSiCl_2$,
$\overset{CH_3}{\underset{|}{}}$ $CH_2=C(CH_3)SiCl_3$, or $CH_2=C(CH_3)SiCl_2$;
$\overset{CH_3}{\underset{|}{}}$ a compound of the formula (IV):

$$CH_2=\overset{R^4}{\underset{|}{C}}-COO(CH_2)_n\overset{R^1_a}{\underset{|}{Si}}-X^2_{3-a} \qquad (IV)$$

wherein $R^1$, $R^4$, $X^2$ and a are as defined above, and n is an integer of 1 to 12, e.g., $CH_2=CHCOO(CH_2)_3SiCl_3$, $CH_2=CHCOO(CH_2)_3SiCl_2$,
$\overset{CH_3}{\underset{|}{}}$ $CH_2=C(CH_3)COO(CH_2)_3SiCl_3$, or
$\overset{CH_3}{\underset{|}{}}$ $CH_2=C(CH_3)COO(CH_2)_3SiCl_2$;
$\overset{CH_3}{\underset{|}{}}$ a compound of the formula (V):

$$CH_2=\overset{R^4}{\underset{|}{C}}-\overset{R^1_a}{\underset{|}{Si}}-(OR^5)_{3-a} \qquad (V)$$

wherein $R^1$, $R^4$ and a are as defined above, and $R^5$ is an alkyl group having 1 to 16 carbon atoms, e.g., $CH_2=CHSi(OCH_3)_3$, $CH_2=CHSi(OCH_3)_2$,
$\overset{CH_3}{\underset{|}{}}$ $CH_2=C(CH_3)Si(OCH_3)_3$, $CH_2=C(CH_3)Si(OCH_3)_2$,
$\overset{CH_3}{\underset{|}{}}$ $CH_2=CHSi(OC_2H_5)_3$, $CH_2=CHSi(OC_3H_7)_3$, $CH_2=CHSi(OC_4H_9)_3$, $CH_2=CHSi(OC_6H_{13})_3$, $CH_2=CHSi(OC_8H_{17})_3$, $CH_2=CHSi(OC_{10}H_{21})_3$, or $CH_2=CHSi(OC_{12}H_{25})_3$, a compound of the formula (VI):

$$CH_2=\overset{R^4}{\underset{|}{C}}-COO(CH_2)_n\overset{R^1_a}{\underset{|}{Si}}-(OR^5)_{3-a} \qquad (VI)$$

wherein $R^1$, $R^4$, $R^5$, a and n are as defined above, e.g., $CH_2=CHCOO(CH_2)_3Si(OCH_3)_3$, $CH_2=CHCOO(CH_2)_3Si(OCH_3)_2$,
$\overset{CH_3}{\underset{|}{}}$ $CH_2=C(CH_3)COO(CH_2)_3Si(OCH_3)_3$,
$\overset{CH_3}{\underset{|}{}}$ $CH_2=C(CH_3)COO(CH_2)_3Si(OCH_3)_2$,
$\overset{CH_3}{\underset{|}{}}$ $CH_2=CHCOO(CH_2)_3Si(OC_2H_5)_3$, $CH_2=CHCOO(CH_2)_3Si(OC_2H_5)_2$,
$\overset{CH_3}{\underset{|}{}}$ $CH_2=C(CH_3)COO(CH_2)_3Si(OC_2H_5)_3$,
$\overset{CH_3}{\underset{|}{}}$ $CH_2=C(CH_3)COO(CH_2)_3Si(OC_2H_5)_2$,
$\overset{CH_3}{\underset{|}{}}$ $CH_2=C(CH_3)COO(CH_2)_{11}Si(OCH_3)_3$, or
$\overset{CH_3}{\underset{|}{}}$ $CH_2=C(CH_3)COO(CH_2)_{11}Si(OCH_3)_2$;
$\overset{CH_3}{\underset{|}{}}$ a compound of the formula (VII):

$$CH_2=\overset{R^4}{\underset{|}{C}}CH_2OCO(ort-C_6H_4)COO(CH_2)_n\overset{R^1_a}{\underset{|}{Si}}(OR^5)_{3-a} \qquad (VII)$$

wherein $R^1$, $R^4$, $R^5$, a and n are as defined above, e.g., $CH_2=CHCH_2OCO(ort-C_6H_4)COO(CH_2)_3Si(OCH_3)_3$, or $CH_2=CHCH_2OCO(ort-C_6H_4)COO(CH_2)_3Si(OCH_3)_2$;
$\overset{CH_3}{\underset{|}{}}$ a compound of the formula (VIII):

$$CH_2=\overset{R^4}{\underset{|}{C}}-(CH_2)_n\overset{R^1_a}{\underset{|}{Si}}-(OR^5)_{3-a} \qquad (VIII)$$

wherein $R^1$, $R^4$, $R^5$, a and n are as defined above, e.g., $CH_2=CH(CH_2)_4Si(OCH_3)_3$, or $CH_2=CH(CH_2)_8Si(OCH_3)_3$;

a compound of the formula (IX):

$$CH_2=\overset{R^4}{\underset{|}{C}}-(p-C_6H_4)\overset{R^1_a}{\underset{|}{Si}}(OR^5)_{3-a} \qquad (IX)$$

wherein $R^1$, $R^4$, $R^5$ and a are as defined above, e.g., $CH_2=CH(p-C_6H_4)Si(OCH_3)_3$, $CH_2=CH(p-C_6H_4)Si(OCH_3)_2$,
$\overset{CH_3}{\underset{|}{}}$ -continued $CH_2=C(CH_3)(p\text{-}C_6H_4)Si(OCH_3)_3$, or $$CH_2=C(CH_3)(p\text{-}C_6H_4)\underset{\underset{CH_3}{|}}{Si}(OCH_3)_2;$$

a compound of the formula (X):

$$CH_2=\underset{\underset{R^4}{|}}{C}-O(CH_2)_n\underset{\underset{R^1{}_a}{|}}{Si}-(OR^5)_{3-a} \quad (X)$$

wherein $R^1$, $R^4$, $R^5$, a and n are as defined above, e.g., $CH_2=CHO(CH_2)_3Si(OCH_3)_3$ a compound of the formula (XI):

$$CH_2=\underset{\underset{R^4}{|}}{C}-R^6-(CH_2)_n\underset{\underset{R^1{}_a}{|}}{Si}-(OR^5)_{3-a} \quad (XI)$$

wherein $R^1$, $R^4$, $R^5$, a and n are as defined above, and $R^6$ is —$CH_2O$— or —$CH_2OCO$—, e.g., $CH_2=CHCH_2O(CH_2)_3Si(OCH_3)_3$, or $CH_2=CHCH_2OCO(CH_2)_{10}Si(OCH_3)_3$;

a compound of the formula (XII):

$$CH_2=\underset{\underset{R^4}{|}}{C}-COO(CH_2)_nO(CH_2)_p-\underset{\underset{R^1{}_a}{|}}{Si}(OR^5)_{3-a} \quad (XII)$$

wherein $R^1$, $R^4$, $R^5$, a and n are as defined above, and p is an integer of 1 to 12, e.g., $CH_2=C(CH_3)COO(CH_2)_2O(CH_2)_3Si(OCH_3)_3$, or $$CH_2=C(CH_3)COO(CH_2)_2O(CH_2)_3\underset{\underset{CH_3}{|}}{Si}(OCH_3)_2;$$

a compound of the formula (XIII):

$$CH_2=CHO(CH_2)_n\underset{\underset{R^1{}_a}{|}}{Si}-(OR^5)_{3-a} \quad (XIII)$$

wherein $R^1$, $R^5$, a and n are as defined above, e.g., $CH_2=CHO(CH_2)_2Si(OCH_3)_3$, $CH_2=CHO(CH_2)_4Si(OCH_3)_3$, or $CH_2=CHO(CH_2)_3Si(OCH_2CH_3)_3$;

and the like. Among them, alkoxysilyl group-containing monomers are particularly preferred from the viewpoints of stability, easiness in handling, cost and no production of by-products.

These silyl group-containing vinyl monomers may be used alone or in admixture thereof. It is preferable that the silyl group-containing vinyl monomers are copolymerized in an amount of 1 to 80 parts by weight, especially 2 to 20 parts by weight. If the amount of the silyl group-containing monomer copolymerized is less than 1 part by weight, the obtained polymer is inferior in water resistance and weatherability, and if the amount is more than 80 parts by weight, the stability of the emulsion is deteriorated, and the storage stability is also deteriorated.

The monomers (a-2) are not particularly limited. Examples of the monomers (a-2) are, for instance, a vinyl monomer such as methyl (meth)acrylate, ethyl (meth) acrylate, butyl (meth)acrylate, isobutyl (meth)acrylate, benzyl (meth)acrylate or cyclohexyl (meth)acrylate; a fluorine-containing vinyl monomer such as trifluoroethyl (meth) acrylate, pentafluoropropyl (meth)acrylate, perfluorocyclohexyl (meth)acrylate, 2,2,3,3-tetrafluoropropyl (meth)acrylate, 2-(perfluorooctyl)ethyl (meth)acrylate, tetrafluoroethylene, chlorotrifluoroethylene, vinylidene fluoride, trifluoroethylene, tetrafluoroethylene or pentafluoropropylene; an aromatic hydrocarbon vinyl compound such as styrene, α-methylstyrene, chlorostyrene, 4-hydroxystyrene or vinyl toluene; an α,β-ethylenically unsaturated carboxylic acid such as acrylic acid, methacrylic acid, maleic acid, maleic anhydride, itaconic acid, itaconic anhydride, crotonic acid, fumaric acid or citraconic acid, and an acid having a polymerizable C—C double bond such as styrene sulfonic acid or vinyl sulfonic acid, or a salt of these acids such as alkali metal salt, ammonium salt or amine salt; an acid anhydride such as maleic anhydride or a half ester thereof with a linear or branched alcohol having 1 to 20 carbon atoms; an amino group-containing (meth)acrylate such as dimethylaminoethyl (meth)acrylate, dimethylaminopropyl (meth)acrylate or diethylaminoethyl (meth) acrylate; (meth)acrylamide, α-ethyl (meth)acrylamide, N-butoxymethyl (meth)acrylamide, N,N-dimethylacrylamide, N-methylacrylamide, acryloylmorpholine, or their hydrochlorides or their acetic acid salts; a vinyl ester and an allyl compound such as vinyl acetate, vinyl propionate or diallyl phthalate; a nitrile-containing vinyl monomer such as (meth)acrylonitrile; an epoxy group-containing vinyl monomer such as glycidyl (meth)acrylate; a hydroxyl group-containing vinyl monomer such as 2-hydroxyethyl (meth)acrylate, 2-hydroxypropyl (meth)acrylate, 2-hydroxyethyl vinyl ether, N-methylol (meth)acrylamide, hydroxystyrene, ARONIX M-5700 (product of Toagosei Chemical Industry Co., Ltd.), Placcel FA-1, Placcel FA-4, Placcel FM-1 or Placcel FM-4 (which are products of Daicel Chemical Industries, Ltd. ), HE-10, HE-20, HP-10 or HP-20 (which are products of Nippon Shokubai Co., Ltd. ), BLEMMER PP series, BLEMMER PE series, BLEMMER PEP series, BLEMMER AP-400, BLEMMER AE-350, BLEMMER NKH-5050 or BLEMMER GLM (which are products of Nippon Oil and Fats Co., Ltd.), MA-30, MA-50, MA-100, MA-150, RA-1120, RA-2614, RMA-564, RMA-568, RMA-1114 or MPG-130-MA (which are products of Nippon Nyukazai Kabushiki Kaisha), or a hydroxyl group-containing vinyl-modified hydroxyalkyl vinyl monomer; a vinyl compound, e.g., a hydroxyalkyl ester of an α,β-ethylenically unsaturated carboxylic acid such as hydroxyalkyl (meth)acrylate, and a phosphate group-containing vinyl compound or a (meth) acrylate containing an urethane bond or siloxane bond; a macromer such as AS-6, AN-6, AA-6, AB-6 or AK-5 which are products of Toagosei Chemical Industry Co., Ltd.; other vinyl monomers such as methyl vinyl ether, vinyl chloride, vinylidene chloride, chloroprene, propylene, butadiene, N-vinylimidazole or vinyl sulfonic acid; a polymerizable light stabilizer and a polymerizable ultraviolet absorbing agent such as LA87, LA82 or LA22 which are products of Asahi Denka Kogyo Kabushiki Kaisha; and the like.

The kinds of the above-mentioned monomers (a-2) are suitably selected in accordance with desired physical properties of the obtained curable resin compositions. For example, when it is desired to raise the stability of the emulsion (A), it is preferable to use a hydrophilic monomer such as (meth)acrylic acid, maleic acid, dimethylaminoethyl (meth)acrylate, (meth)acrylamide, a hydroxyl group-containing vinyl monomer, polyethylene glycol methacrylate or polypropylene glycol methacrylate. When it is desired to raise the water-resistance and weatherability of coating films formed from the obtained resin compositions, it is preferable to introduce into polymers functional groups capable of causing crosslinking in each of emulsion particles or between emulsion particles, or to use a fluorine-containing vinyl monomer or a siloxane-containing vinyl monomer. Also, use of an acidic vinyl monomer improves the mechanical stability of the emulsion (A).

Also, if a hydrophilic monomer having polyoxyethylene chain among the monomers mentioned above is used, the mechanical and chemical stabilities of the emulsion (A) and the water resistance and gloss of coating films formed from the obtained curable resin compositions are improved without deteriorating the stability of silyl group in the above-mentioned monomers and, therefore, the use thereof is preferable. The amount of the hydrophilic monomer having a polyoxyethylene chain is from 0.1 to 10 parts by weight per 100 parts by weight of all monomers used. If the amount is less than 0.1 part by weight, the mechanical stability of the emulsion (A) and the gloss of the coating films formed from the obtained curable resin compositions tends to be lowered. If the amount is more than 10 parts by weight, the coating films are softened and, therefore, stains tend to easily stick to the coating films.

In addition, monomers having at least two polymerizable unsaturated bonds, such as polyethylene glycol dimethacrylate, ethylene glycol diacrylate and triallyl cyanurate, may be used in order to impart a crosslinked structure to the produced polymers.

Further, for example, it is preferable to use a methacrylate having an alkyl or cycloalkyl group with 4 or more carbon atoms such as n-butyl methacrylate, isobutyl methacrylate, t-butyl methacrylate or cyclohexyl methacrylate, since the stability of the silyl groups in the polymer (A) is raised.

With respect to the amounts of the monomer (a-1) and the monomer (a-2), it is desirable that the amount of the monomer (a-1) is from 1 to 30 parts by weight, preferably 1.1 to 25 parts by weight, more preferably 2 to 20 parts by weight, per 100 parts by weight of the total amount of the polymerizable components, in other words, the amount of the monomer (a-2) is from 70 to 99 parts by weight, preferably 75 to 98.9 parts by weight, more preferably 80 to 98 parts by weight, per 100 parts by weight of the total amount of the polymerizable components. If the amount of the monomer (a-1) is less than the above-mentioned lower limit, in other words, if the amount of the monomer (a-2) exceeds the above-mentioned upper limit, the water resistance and weatherability of coating films formed by using the obtained polymers (A) tend to be inferior. Also, if the amount of the monomer (a-1) exceeds the above-mentioned upper limit, in other words, if the amount of the monomer (a-2) is less than the above-mentioned lower limit, the stability of the emulsion (A) tends to deteriorate.

In the present invention, from the viewpoints that the hydrolyzable silyl groups are stable in water, the cost is low and by-products produced when forming coating films from obtained resin compositions do not exert a bad influence on the coating films, preferred are polymers (A) obtained by using an alkoxysilyl group-containing vinyl monomer as the monomer (a-1) and using a hydrophilic vinyl monomer having a polyoxyethylenen chain as the monomer (a-2). In particular, emulsion-polymerized copolymers obtained by copolymerization of a polymerization component comprising 1 to 30 parts by weight, especially 2 to 25 parts by weight, of the alkoxysilyl group-containing vinyl monomer, 0.1 to 10 parts by weight, especially 0.5 to 10 parts by weight, of the hydrophilic monomer having a polyoxyethylene chain and the balance of other vinyl monomers are preferred from the viewpoints of the stability of the alkoxysilyl groups, the mechanical stability of the emulsions (A), and excellent water resistance and gloss of coating films formed from obtained resin compositions.

Explaining the process of preparation according to the present invention, the emulsion polymerization method of the present invention can be suitably selected from emulsion polymerization manners such as batchwise polymerization, monomer dropwise addition polymerization, emulsified monomer dropwise addition polymerization and the like. In particular, polymerization methods wherein monomers or emulsified monomers are added dropwise are suitable in assuring the stability at the time of the preparation.

Usual emulsifiers can be used in the emulsion polymerization without any restriction, e.g., ionic and non-ionic surface active agents. Representative examples of the ionic surface active agent are a sulfonic acid salt such as sodium laurylsulfonate, sodium dodecylbenzenesulfonate or sodium isooctylbenzenesulfonate; an anionic surface active agent having (poly)oxyethylene group such as Newcol-723SF, Newcol-707SN, Newcol-707SF, Newcol-740SF or Newcol-560SN (which are products of Nippon Nyukazai Kabushiki Kaisha); an ammonium salt such as imidazoline laurate or ammonium hydroxide; and the like. Representative examples of the non-ionic surface active agent are a polyoxyethylene surface active agent such as polyoxyethylene nonyl phenyl ether or polyoxyethylene lauryl ether; a silicon-containing non-ionic surface active agent such as L-77, L-720, L-5410, L-7602 or L-7607 (which are products of Union Carbide Corp.); and the like. Also, it is possible to improve the water resistance by using an emulsifier having an polymerization reactivity such as Adeka Reasoap NE-10, NE-20, NE-30, NE-40 or SE-10N (which are products of Asahi Denka Kogyo Kabushiki Kaisha), Antox-MS-60, Antox-MS-2N or RMA-653 (which are products of Nippon Nyukazai Kabushiki Kaisha), or Aqualon RN20, RN30, RN50, HS05, HS10, HS20 or HS1025 (which are products of Dai-Ichi Kogyo Seiyaku Kabushiki Kaisha).

The above-mentioned surface active agents can be used alone or in admixture thereof. Preferably, the amount of the surface active agent is at most 10 parts by weight, especially from 0.5 to 8 parts by weight, per 100 parts by weight of the total amount of the polymerizable components. If the amount of the surface active agent exceeds the above-mentioned upper limit, the water resistance of coating films formed from obtained resin compositions tends to deteriorate.

In case of obtaining emulsion-polymerized polymers by using the above-mentioned alkoxysilyl group-containing vinyl monomer and hydrophilic vinyl monomer having polyoxyethylene chain, it is preferable, from the viewpoint of the stability of alkoxysilyl groups, to use the above-mentioned anionic surface active agent having an polyoxyethylene chain as the emulsifier in an amount of 0.2 to 10 parts by weight, especially 0.5 to 8 parts by weight, per 100 parts by weight of the total amount of the polymerizable components.

Also, when it is desired to further improve the water resistance of coating films, water-soluble . resins to which the silyl group represented by the formula (I) is introduced may be used instead of such surface active agents.

Redox catalysts can be used as a polymerization initiator in order to more stably conduct the polymerization of the monomer (a-1) and the monomer (a-2). Also, in maintaining the stability of a liquid mixture during the polymerization and stably conducting the polymerization, it is preferable that the temperature is at most 70° C., especially from 40° to 65° C. For stabilization of the silyl groups, it is preferable to adjust the pH to 5 to 8, especially 5 to 7.

Polymerization initiators usually employed can be used. Redox catalysts are preferred from the viewpoints of polymerization stability and the like, e.g. a combination of potassium persulfate or ammonium persulfate with sodium bisulfite or Rongalit, a combination of hydrogen peroxide with ascorbic acid, and a combination of an organic peroxide such as t-butyl hydroperoxide, benzoyl peroxide, cumene hydroperoxide or p-menthane hydroperoxide with sodium bisulfite or Rongalit. In particular, organic peroxide-reducing agent redox initiators are preferred. In order to stably obtain the catalytic activity, there may be used in combination a compound containing a bivalent iron ion such as iron sulfate and a chelating agent such as ethylenediaminetetraacetic acid disodium salt.

It is preferable that the amount of the polymerization initiator is from 0.01 to 10 parts by weight, especially 0.05 to 5 parts by weight, based on 100 parts by weight of the total amount of the polymerizable components. If the amount of the polymerization initiator is less than the above-mentioned lower limit, there is a case where the polymerization does not proceed. If the amount exceeds the above-mentioned upper limit, the molecular weight of the produced polymers tends to lower, thus resulting in deterioration of the durability of coating films formed from the obtained resin compositions.

Also, in order to stably provide a catalytic activity of the polymerization initiators, it is preferable to use in combination a compound containing a bivalent iron ion such as iron sulface and a chelating agent such as disodium ethylenediaminetetraacetate. Preferably, the amount of such a chelating agent is from 0.0001 to 1 part by weight, especially 0.001 to 0.5 part by weight, per 100 parts by weight of the total amount of the polymerizable components.

In the present invention, it is preferable that the solid concentration of the emulsion (A) is from 20 to 70% by weight, especially 30 to 60% by weight.

If the solid concentration is more than 70% by weight, the viscosity of the system may markedly rise and, consequently, there occur problems such that it is difficult to remove heat generated by a polymerization reaction and it takes a long time in taking out the product from a polymerization vessel. In case that the solid concentration is less than 20% by weight, no problem occurs in polymerization operation. However, the amount of a resin produced by one polymerization operation is small and it is very disadvantageous in economical point of view. From the viewpoint of demands on uses, the concentration below 20% by weight is also disadvantageous in coating workability and deterioration of film performances, since the thickness of a coating film becomes thin.

The thus obtained emulsion (A) is composed of ultra fine particles having an average particle size of about 0.02 to about 1.0 μm, thus having an excellent film forming ability.

The silicon compounds of the formula (II) and/or the partial hydrolysis condensation products thereof in the above-mentioned component (B) are not particularly limited. Examples of them are, for instance, a tetraalkyl silicate such as tetramethyl silicate, tetraethyl silicate, tetra-n-propyl silicate, tetraisopropyl silicate, tetra-n-butyl silicate, tetraisobutyl silicate, tetra-t-butyl silicate, or MSi5, ESi28 or ESi40 (which are products of COLCOAT CO., LTD.) and/or a partial hydrolysis condensation product thereof; a trialkoxysilane such as methyltrimethoxysilane, methyltriethoxysilane, ethyltrimethoxysilane, ethyltriethoxysilane, phenyltrimethoxysilane, phenyltriethoxysilane, octadecyltriethoxysilane, 3-glycidoxypropyltrimethoxysilane, 3-(meth) acryloyloxypropyltrimethoxysilane, 3-(meth) acryloyloxypropyltriethoxysilane, methyltrisecoctyloxysilane, methyltributoxysilane or AFP-1 (product of Shin-Etsu Chemical Co., Ltd.) and/or a partial hydrolysis condensation product thereof; and the like.

The compounds of component (B) may be used alone or in admixture thereof. The component (B) is used in an amount of 1 to 70 parts by weight, preferably 2 to 50 parts by weight, per 100 parts by weight of the solid matter of the component (A). If the amount of the component (B) is less than 1 part by weight, the hardness and hydrophilic property of the obtained coating films are not sufficient, and if the amount is more than 70 parts by weight, problems such as film appearance and cracking occur.

The component (B) may be previously incorporated into the emulsion (A), followed by preparation of paints therefrom, or may be incorporated into the emulsion (A) which has been prepared into paints. From the viewpoint of imparting a stain resistance by the addition of the component (B), it is preferably incorporated into the emulsion (A) prepared into paints, more preferably it is incorporated just before applying the paints.

The silicon compounds having in a molecule at least one amino group and/or its derivative and at least one hydrolyzable silyl group in the component (C) are not particularly limited, and there are exemplified, for instance, compounds represented by the formulas (XIV) and (XV) and/or salts thereof:

(XIV)

wherein $R^7$, $R^8$ and $R^9$ are the same or different and each is an alkyl group having 1 to 10 carbon atoms, an aryl group having 6 to 10 carbon atoms or an aralkyl group having 7 to 10 carbon atoms, $X^3$ is at least one group selected from the group consisting of a halogen atom, an alkoxyl group, a hydroxyl group, an acyloxy group, an aminooxy group, a phenoxy group, a thioalkoxy group and an amino group, A is an alkylene group having 1 to 10 carbon atoms or a polyoxyalkylene group having 1 to 100 carbon atoms, c and e are an integer of 0 to 2, d is an integer of 0 to 1, and m is an integer of 0 to 5,

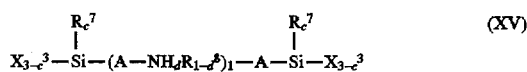

(XV)

wherein $R^7$, $R^8$, $X^3$, c and d are as defined above, and l is an integer of 1 to 6.

Examples of the silicon compounds (XIV) and (XV) having at least one amino group and/or its derivative and at least one hydrolyzable silyl group in one molecule, and/or the salts thereof are, for instance, an amino group-containing silane triol compound such as (HO)$_3$Si(CH$_2$)$_3$NH$_2$, (HO)$_3$Si(CH$_2$)$_3$NHCH$_3$, (HO)$_3$Si(CH$_2$)$_3$N(CH$_3$)$_2$, -continued (HO)₃Si(CH₂)₃NH(CH₂)₂NH₂, (HO)₃Si(CH₂)₃NH(CH₂)₂NH(CH₂)₂NH₂, $$(HO)_2Si(CH_2)_3NH_2, \text{ or}$$
     |
     CH₃

$$(HO)_2Si(CH_2)_3NH_2;$$
     |
     CH₃ a monoaminosilane such as (CH₃O)₃Si(CH₂)₃NH₂, (C₂H₅O)₃Si(CH₂)₃NH₂, $$(CH_3O)_2Si(CH_2)_3NH_2,$$
     |
     CH₃

$$(C_2H_5O)_2Si(CH_2)_3NH_2,$$
     |
     CH₃

(CH₃O)₃Si(CH₂)₃NHCH₃, (C₂H₅O)₃Si(CH₂)₃NHCH₃, (C₂H₅O)₃Si(CH₂)₃NHC₂H₅, (C₂H₅O)₃Si(CH₂)₃NHC₄H₉, (C₂H₅O)₃Si(CH₂)₃NHC₆H₅, (C₂H₅O)₃Si(CH₂)₃NHCH₂C₆H₅, $$(CH_3O)_2Si(CH_2)_3NHCH_3,$$
     |
     CH₃

$$(C_2H_5O)_2Si(CH_2)_3NNHCH_3,$$
     |
     CH₃

$$(C_2H_5O)_2Si(CH_2)_3NHC_2H_5,$$
     |
     CH₃

$$(C_2H_5O)_2Si(CH_2)_3NHC_4H_9,$$
     |
     CH₃

$$(C_2H_5O)_2Si(CH_2)_3NHC_6H_5,$$
     |
     CH₃

$$(C_2H_5O)_2Si(CH_2)_3NHCH_2C_6H_5,$$
     |
     CH₃

(CH₃O)₃Si(CH₂)₃N(CH₃)₂, (C₂H₅O)₃Si(CH₂)₃N(CH₃)₂, (C₂H₅O)₃Si(CH₂)₃N(C₂H₅)₂, $$(CH_3O)_2Si(CH_2)_3N(CH_3)_2,$$
     |
     CH₃

$$(C_2H_5O)_2Si(CH_2)_3N(CH_3)_2,$$
     |
     CH₃

$$(C_2H_5O)_2Si(CH_2)_3N(C_2H_5)_2,$$
     |
     CH₃

(CH₃O)₃Si(CH₂)₃N⁺(CH₃)₃·Cl⁻, (C₂H₅O)₃Si(CH₂)₃N⁺(CH₃)₃·Cl⁻, (C₂H₅O)₃Si(CH₂)₃N⁺(CH₃)₃·I⁻, (C₂H₅O)₃Si(CH₂)₃N⁺(C₂H₅)₃·Cl⁻, $$(CH_3O)_3Si(CH_2)_3N^+C_2H_2O \cdot I^-,$$
                    |
                    C₂H₂

$$(CH_3O)_2Si(CH_2)_3N^+(CH_3)_3 \cdot Cl^-,$$
     |
     CH₃

$$(C_2H_5O)_2Si(CH_2)_3N^+(CH_3)_3 \cdot Cl^-,$$
     |
     CH₃

$$(C_2H_5O)_2Si(CH_2)_3N^+(CH_3)_3 \cdot I^-,$$
     |
     CH₃

$$(C_2H_5O)_2Si(CH_2)_3N^+(C_2H_5)_3 \cdot Cl^-,$$
     |
     CH₃

(CH₃O)₃Si(CH₂)₃NNH(CH₂)₃Si(OCH₃)₃, or $$(CH_3O)_2Si(CH_2)_3NH(CH_2)_3Si(OCH_3)_2;$$
     |                          |
     CH₃                        CH₃ a diaminosilane such as (CH₃O)₃Si(CH₂)₃NH(CH₂)₂NH₂, (CH₃O)₃Si(CH₂)₆NH(CH₂)₂NH₂, (CH₃O)₃Si(CH₂)₂(p-C₆H₄)CH₂NH(CH₂)₂NH₂, (C₂H₅O)₃Si(CH₂)₃NH(CH₂)₂NH₂, $$(CH_3O)_3Si(CH_2)_3NN(CH_2)_2NH_2,$$
     |
     CH₃

$$(C_2H_5O)_2Si(CH_2)_3NN(CH_2)_2NH_2,$$
     |
     CH₃

(CH₃O)₃Si(CH₂)₃NH(CH₂)₂NHCH₃, (C₂H₅O)₃Si(CH₂)₃NH(CH₂)₂NHCH₃, $$(CH_3O)_2Si(CH_2)_3NH(CH_2)_2NHCH_3,$$
     |
     CH₃

$$(C_2H_5O)_2Si(CH_2)_3NH(CH_2)_2NHCH_3,$$
     |
     CH₃

(CH₃O)₃Si(CH₂)₃NH(CH₂)₂N(CH₃)₂, (C₂H₅O)₃Si(CH₂)₃NH(CH₂)₂N(CH₃)₂, $$(CH_3O)_2Si(CH_2)_3NH(CH_2)_2N(CH_3)_2,$$
     |
     CH₃

$$(C_2H_5O)_2Si(CH_2)_3NH(CH_2)_2N(CH_3)_2,$$
     |
     CH₃

(CH₃O)₃Si(CH₂)₃NH(CH₂)₂NNHCH₃·HCl, (CH₃O)₃Si(CH₂)₃NH(CH₂)₂NHCH₂C₅H₆·HCl, (CH₃O)₃Si(CH₂)₃NH(CH₂)₂N(CH₃)₂·HCl,

-continued $(CH_3O)_2Si(CH_2)_3NN(CH_2)_2N(CH_3)_2 \cdot HCl$, $(CH_3O)_3Si(CH_2)_3NN(CH_2)_2NH(CH_2)_3Si(OCH_3)_3$, or $(CH_3O)_2Si(CH_2)_3NN(CH_2)_2NH(CH_2)_3Si(OCH_3)_2$ (with $CH_3$ groups);

a triaminosilane such as $(CH_3O)_3Si(CH_2)_3NH(CH_2)_2NH(CH_2)_2NH_2$, $(C_2H_5O)_3Si(CH_2)_3NH(CH_2)_2NH(CH_2)_2NH_2$, $(CH_3O)_2Si(CH_2)_3NH(CH_2)_2NH(CH_2)_2NH_2$ (with $CH_3$), $(C_2H_5O)_2Si(CH_2)_3NH(CH_2)_2NH(CH_2)_2NH_2$ (with $CH_3$), $(CH_3O)_3Si(CH_2)_3NH(CH_2)_2NH(CH_2)_2NH(CH_2)_3Si(OCH_3)_3$, or $(CH_3O)_2Si(CH_2)_3NH(CH_2)_2NH(CH_2)_2NH(CH_2)_3Si(OCH_3)_2$ (with $CH_3$ groups);

X-12-5204, X-12-633AT, X-12-734, X-12-575, X-12-577, X-12-563B, X-12-565, X-12-730, X-12-562, CF-136, KBE-9703 and KBM-576 (which are products of Shin-Etsu Chemical Co., Ltd.); A-1100, A-1110, A-1122, A-1106, A-1126, A-1160, Y-9138, Y-5823, Y-5987, AZ-6131 and AZ-6160 (which are products of Nippon Unicar Kabushiki Kaisha); SH6020, SH6026, SZ6023, SZ6032, SZ6050, SZ6079, SA6083 and AY43-021 (which are products of Toray Silicone Kabushiki Kaisha); TSL8331, TSL8340 and TSL8345 (which are products of Toshiba Silicone Kabushiki Kaisha); and the like.

The compounds of component (C) may be used alone or in admixture thereof. The component (C) is used preferably in an amount of 1 to 70 parts by weight, more preferably 2 to 50 parts by weight, per 100 parts by weight of the solid resin of the component (A). If the amount is less than 1 part by weight, an effect of imparting a stain resistance is scarcely exhibited. If the amount is more than 70 parts by weight, the stability of the emulsion is lowered and the storage stability is also lowered.

The component (C) may be previously incorporated into the emulsion (A), followed by preparation into paints, or may be incorporated into the emulsion (A) which has been prepared into paints.

Also, it is possible to use a blend of one or more of the component (B) with one or more of the component (C). In that case, the total mount of the components (B) and (C) is from 1 to 70 parts by weight per 100 parts by weight of the emulsion (A).

Examples of the curing catalyst (D) are, for instance, an organotin compound such as dibutyl tin dilaurate, dibutyl tin maleate, dioctyl tin dilaurate, dioctyl tin maleate or tin octylate; phosphoric acid and a phosphoric acid ester such as monomethyl phosphate, monoethyl phosphate, monobutyl phosphate, monooctyl phosphate, monodecyl phosphate, dimethyl phosphate, diethyl phosphate, dibutyl phosphate, dioctyl phosphate or didecyl phosphate; an addition reaction product of phosphoric acid and/or an acid phosphoric acid monoester with an epoxy compound such as propylene oxide, butylene oxide, cyclohexene oxide, glycidyl methacrylate, glycidol, acryl glycidyl ether, 3-glycidoxypropyltriethoxysilane, 3-glycidoxypropylmethyldimethoxysilane, (3,4-epoxycyclohexyl)ethyltrimethoxysilane, or Cardula E, Epikote 828 and Epikote 1001 which are products of Yuka Shell Epoxy Kabushiki Kaisha; an organotitanium compound; an organoaluminum compound; an organozirconium compound; an acidic compound such as maleic acid, adipic acid, azelaic acid, sebacic acid, itaconic acid, citric acid, succinic acid, trimellitic acid, pyromellitic acid, their anhydrides, or p-toluenesulfonic acid; an amine such as hexylamine, di(2-ethylhexyl)amine, N,N-dimethyldodecylamine or dodecylamine; a reaction product or mixture of the amine with an acid phosphoric acid ester; an alkaline compound such as sodium hydroxide or potassium hydroxide; and the like.

In case of using an organometallic compound as the curing catalyst, it is preferable to add the organometallic compound which has been previously emulsified using an alkyl ether type surface active agent, to a resin composition when the resin composition is coated onto materials to be coated, since the composition is superior in curability and storage stability. Such an emulsion of the organometallic compound is composed of an organometallic compound and, per 100 parts by weight of the organometallic compound, 10 to 200 parts by weight, preferably 20 to 100 parts by weight, of an alkyl ether type surface active agent, 80 to 1,500 parts by weight, preferably 200 to 1,200 parts by weight, of deionized water, and 10 to 200 parts by weihgt, preferably 20 to 100 parts by weight, of an antifreezing agent such as polyethylene glycol. The content of the organometallic compound in the emulsion is from 5 to 50%, preferably 7 to 30%.

The catalysts (D) may be used along or in admixture thereof. The amount of the component (D) is not particularly limited, but is from 0 to 20 parts by weight, usually 0.1 to 20 parts by weight, preferably 0.5 to 10 parts by weight, per 100 parts by weight of the solid resin of component (A). If the amount is less than 0.1 part by weight, the curability of a composition tends to lower. If the amount is more than 20 parts by weight, the appearance of coating films tends to lower.

The aqueous coating composition comprising the component (A), the components (B) and/or (C) and the component (D) has an excellent film forming ability as it is. It is possible to further raise the film forming ability by using a co-solvent. Examples of the co-solvent are, for instance, an alcohol such as methyl alcohol, ethyl alcohol, propyl alcohol, isopropyl alcohol, n-butyl alcohol, isobutyl alcohol, hexyl alcohol or octyl alcohol; an ether compound such as cellosolve, ethyl cellosolve, butyl cellosolve, diethylene glycol monoethyl ether, diethylene glycol monobutyl ether, propylene glycol monoethyl ether, propylene glycol monobutyl ether, propylene glycol monoisobutyl ether, dipropylene glycol monoethyl ether, dipropylene glycol monobutyl ether, dipropylene glycol isobutyl ether, tripropylene glycol monoethyl ether, tripropylene glycol monobutyl ether or tripropylene glycol monoisobutyl ether; a glycol ether ester such as butyl cellosolve acetate, diethylene glycol monobutyl ether acetate, dipropylene glycol monobutyl ether acetate, tripropylene glycol monobutyl ether acetate or tripropylene glycol monoisobutyl ether acetate; and the like.

The co-solvents may be added at the time of the polymerization to obtain the emulsion-polymerized copolymers (A) or after the completion of the polymerization.

In order to raise the weatherability of coating films formed from the composition of the present invention, it is possible to add a ultraviolet absorber or a light stabilizer. The ultraviolet absorbers are not particularly limited, but liquid ones are preferred from the viewpoint of easiness in handling, e.g., benzotriazole ultraviolet absorbers which are liquid at ordinary temperature, such as i-octyl-3-[3-(2H-benzotriazole-2-yl)-5-t-butyl-4-hydroxyphenyl] propionate (trade mark "TINUVIN 384", product of Nippon Ciba-Geigy Kabushiki Kaisha), and a reaction product of methyl-3-[3-( 2H-benzotriazole-2-yl)-5-t-butyl-4-hydroxyphenyl] propionate with polyethylene glycol (trade mark "TINUVIN 1130", product of Nippon Ciba-Geigy Kabushiki Kaisha). The ultraviolet absorbers may be used alone or in admixture thereof. The light stabilizers are also not particularly limited, but liquid ones are preferred from easiness in handling, e.g., hindered amine light stabilizers which are liquid at ordinary temperature, such as bis( 1-octyloxy-2,2,6,6-tetramethyl-4-piperidyl) sebacate (trade mark "TINUVIN 123", product of Nippon Ciba-Geigy Kabushiki Kaisha) and bis(1,2,2,6,6-pentamethyl-4-piperidyl) sebacate (trade mark "TINUVIN 292", product of Nippon Ciba-Geigy Kabushiki Kaisha). The light stabilizers may be used alone or in admixture thereof.

These ultraviolet absorbers and light stabilizers may be used together.

In the present invention, those having no imino group in their structure are preferred from the viewpoint of stability of the emulsion (A).

To the obtained aqueous resin composition for water-based paints may be added as occasion demands additives which have been employed as usual paint components, for example, pigments usually used for paints (white pigment such as titanium dioxide, calcium carbonate, barium carbonate or kaoline, and color pigment such as carbon black, red iron oxide or phthalocyanine blue), plasticizer, solvent, dispersing agent, thickener, defoamer, antiseptics, antisettling agent, leveling agent, ultraviolet absorber, and the like. If the aqueous resin composition is incorporated with titanium dioxide, the gloss and weatherability are improved by using titanium dioxide having an isoelectric point of at least 7, e.g., JR901, JR603 or JR602 (which are products of Tayca Corporation).

Also, commercially available water-based paints can be incorporated into the resin composition for water-based paints of the present invention. Examples of such water-based paints are, for instance, thermosetting acrylic paints such as acrylic paints and acrylic melamine paints, alkyd paints, epoxy paints, fluororesin paints, and the like. The weatherability, acid resistance, solvent resistance and the like of coating films formed from the resin composition can be improved by the incorporation of these paints.

The effect of imparting the stain resistance according to the present invention is exhibited by coating materials to be coated with the resin composition containing the emulsion (A) and, per 100 parts by weight of the emulsion (A), 1 to 70 parts by weight of the silicon compound (II) and/or its partial hydrolysis condensation product (B) and/or the silicon compound (C) having at least one amino group and/or its derivative and at least one hydrolyzable silyl group in a molecule, and 0 to 20 parts by weight of the curing catalyst (D), particularly by mixing them just before coating the materials. The mechanism of exhibiting the stain resistance imparting effect is that the components (B) and/or (C) localize in the surface region of a coating film when a crosslinking reaction occurs, whereby a film surface hardness and a hydrophilic properties are imparted to the coating film. Since the surface hardness of the coating film is increased, the coating film is hard to get a scratch, thus preventing the coating film from staining. In addition, since the coating film is hydrophilic, an effect that the coating film is cleaned by rain is simultaneously exhibited, thus the coating film having a more excellent stain resistance is formed.

Like this, cured products (coating films) having excellent physical properties such as stain resistance, weatherability, adhesion property and durability can be formed on the surface of materials to be coated by applying the composition containing the components (A), (B) and/or (C), and (D) to the materials to be coated in a usuall manner and then aging the coated composition usually at a temperature of 10° C. or higher.

The composition of the present invention is used, for instance, as a paint for interior of buildings, a paint for automobiles such as a metallic base paint or a clear coat on a metallic base, a paint for directly coating metals such as aluminum, stainless steel and silver, a paint for directly coating ceramic products such as slate, concrete, roof tile, mortar, gypsum board, asbestos cement slate, asbestos board, precast concrete, light-weight cellular concrete, calcium silicate board, tile and brick, a paint for glass, a paint for stone such as natural marble or granite, and as finishing paints for them. Also, the composition of the present invention can be used not only for direct coating of materials, but also for coating on a water-based or solvent-based primer, an acrylic rubber, a multi-layer coat or a water-based or solvent-based penetrative water absorption inhibitor coated on an inorganic material such as concrete.

The process for the preparation and the production of the composition of the present invention is explained by means of the following Examples.

PREPARATION EXAMPLES 1 TO 4

A reactor equipped with a stirrer, a reflux condenser, a tube for introducing nitrogen gas and a dropping funnel was charged with 40 parts by weight (hereinlater denoted as part) of deionized water, 1 part of polyoxyethylene nonyl phenyl ether sulfate (Prep. Exs. 1 to 3) or sodium dodecylbenzenesulfonate (Prep. Ex. 4), 1 part of polyoxyethylene nonyl phenyl ether, 0.5 part of ammonium acetate, 0.3 part of rongalite and 0.1 part of t-butyl hydroperoxide. The reactor was heated to 50° C. with introducing nitrogen gas thereto, and 20 parts among 158 parts of a mixture having the composition shown in Table 1 was added dropwise to the reactor through the dropping funnel over 30 minutes to carry out the initial polymerization. After one hour from the completion of the dropwise addition, the remaining 138 parts of the mixture and 0.1 part of t-butyl hydroperoxide were added dropwise to the reactor at a constant rate through the dropping funnel over 3 hours. Thereafter, the polymerization was further continued for 1 hour and deionized water was then added to the reaction mixture to give an emulsion (A-1), (A-2), (A-3) or (A-4) having a polymer solid concentration of 50% by weight.

TABLE 1

| | Preparation Example No. | | | |
|---|---|---|---|---|
| | 1 | 2 | 3 | 4 |
| | Emulsion No. | | | |
| Composition of mixture (part) | A-1 | A-2 | A-3 | A-4 |
| Butyl methacrylate | 60 | 60 | 60 | 60 |
| Methyl methacrylate | 18 | 18 | 18 | 20 |
| Butyl acrylate | 15 | 15 | 10 | 18 |
| Methacrylic acid ester (MA100) | 2 | 2 | 2 | 2 |
| γ-Methacryloyloxypropyltrimethoxysilane | 5 | — | — | — |
| γ-Methacryloyloxypropyltriethoxysilane | — | 5 | 10 | — |
| Polyoxyethylene nonyl phenyl ether | 1 | 1 | 1 | 1 |
| Polyoxyethylene nonyl phenyl ether sulfate | 1 | 1 | 1 | — |

TABLE 1-continued

|  | Preparation Example No. | | | |
|---|---|---|---|---|
|  | 1 | 2 | 3 | 4 |
|  | Emulsion No. | | | |
| Composition of mixture (part) | A-1 | A-2 | A-3 | A-4 |
| Sodium dodecylbenzenesulfonate | — | — | — | 1 |
| Deionized water | 56 | 56 | 56 | 56 |

EXAMPLE 1

To 100 parts of titanium oxide CR97 (made by Ishihara Sangyo Kaisha, Ltd.) were added 3 parts of SMA 1440 (made by ATOCHEM Kabushiki Kaisha), 1 part of Emulgen A-60 (made by Kao Corporation), 10 parts of a 2% aqueous solution of Thirose H-4000P (made by Hoechst Gohsei Kabushiki Kaisha), 0.5 part of SN Defoamer 247 (made by Sannopuko Kabushiki Kaisha), 0.5 part of 15% aqueous ammonia and 25 parts of deionized water. A necessary amount of glass beads having a particle size of 2 mm was added to the resulting mixture, and the mixture was agitated at 1,000 r.p.m. for 1 hour using a sand mill to give a pigment paste.

To 60 parts of emulsion (A-1) was added 3 parts of CS-12 (made by Chisso Corporation), and after thoroughly agitating, thereto were added 30 parts of the pigment paste, 2 parts of a 2% aqueous solution of Thirose H-4000P (made by Hoechst Gohsei Kabushiki Kaisha), 2 parts of a 20% aqueous solution of Adekanol UH-420 (made by Asahi Denka Kogyo Kabushiki Kaisha), 2.9 parts of propylene glycol and 0.1 part of SN Defoamer 247 (made by Sannopuko Kabushiki Kaisha). The resulting mixture was agitated at 500 r.p.m. for 10 minutes to give a white enamel (A-I).

Just before coating, the white enamel (A-I) was incorporated with 3 parts of MSI 51 (product of Colcoat Co., Ltd., a condensation product of partially hydrolyzed tetramethyl silicate) and 3 parts of an emulsion of dibutyltin dilaurate (tin compound content 10%) based on 100 parts of the white enamel (A-I). The enamel was diluted with deionized water to a viscosity suitable for coating, and was air-sprayed to a slate board. The coated slate board was then aged at 20° C. for 10 days.

EXAMPLES 2 TO 5

A white enamel (A-II) was prepared using emulsion (A-2) in the same manner as in Example 1.

Just before coating, the white enamel (A-II) was incorporated with 3 parts of tetraethoxysilane (Example 2) or 1.5 parts (Example 3), 3 parts (Example 4) or 6 parts (Example 5) of ESI 40 (product of Colcoat Co., Ltd., condensation product of partially hydrolyzed tetramethyl silicate) and 5 parts of an emulsion of dibutyltin dilaurate (tin compound content 10%) based on 100 parts of the enamel (A-II). The enamel was diluted with deionized water to a viscosity suitable for coating, and was air-sprayed onto a slate board. The coated slate board was then aged at 20° C. for 10 days.

EXAMPLE 6

A white enamel (A-III) was prepared using emulsion (A-3) in the same manner as in Example 1.

Just before coating, the white enamel (A-III) was incorporated with 3 parts of ESI 40 (product of Colcoat Co., ltd., condensation product of partially hydrolyzed tetramethyl silicate) and 5 parts of a 10% emulsion of dibutyltin dilaurate based on 100 parts of the white enamel (A-III). The white enamel was then diluted with deionized water to a viscosity suitable for coating, air-sprayed onto a slate board and aged at 20° C. for 10 days.

EXAMPLE 7

Just before coating, the white enamel (A-I) was incorporated with 3 parts of methyltrimethoxysilane and 3 parts of an emulsion of dibutyltin dimaleate (tin compound content 10%) based on 100 parts of the enamel (A-I). The enamel was diluted with deionized water to a viscosity suitable for coating, air-sprayed onto a slate board and aged at 20° C. for 10 days.

EXAMPLES 8 TO 10

To 60 parts of emulsion (A-1) was added 3 parts of CS-12 (made by Chisso Corporation), and after thoroughly agitating, thereto was added 3 parts of MSI 51 (product of Colcoat Co., Ltd., condensation product of partially hydrolyzed tetramethyl silicate), and the emulsion was agitated and then incorporated with 30 parts of the pigment paste, 2 parts of a 2% aqueous solution of Thirose H-4000P (made by Hoechst Gohsei Kabushiki Kaisha), 2 parts of a 20% aqueous solution of Adekanol UH-420 (made by Asahi Denka Kogyo Kabushiki Kaisha), 2.9 parts of propylene glycol and 0.1 part of SN Defoamer 247 (made by Sannopuko Kabushiki Kaisha). The resulting mixture was agitated at 500 r.p.m. for 10 minutes to give a white enamel (A-IV).

For emulsions (A-2) and (A-3), 3 parts of ESI 40 (product of Colcoat Co., Ltd., condensation product of partially hydrolyzed tetraethyl silicate) was added to each of the emulsions in the same manner as above to give white enamels (A-V) and (A-VI).

To 100 parts of the white enamel (A-IV) was added 3 parts of an emulsion of dibutyltin dilaurate (tin compound content 10%) (Example 8). To 100 parts of each of the white enamels (A-V) and (A-VI) was added 5 parts of the emulsion of dibutyltin dilaurate (Examples 9 and 10). Each of the enamels was diluted with deionized water to a viscosity suitable for coating, air-sprayed onto a slate board and aged at 20° C. for 10 days.

EXAMPLE 11

To 60 parts of emulsion (A-1) was added 3 parts of CS-12 (made by Chisso Corporation), and after thoroughly agitating, thereto was added 3 parts of 3-aminopropylsilane triol, and the emulsion was agitated and then incorporated with 30 parts of the pigment paste, 2 parts of a 2% aqueous solution of Thirose H-4000P (made by Hoechst Gohsei Kabushiki Kaisha), 2 parts of a 20% aqueous solution of Adekanol UH-420 (made by Asahi Denka Kogyo Kabushiki Kaisha), 2.9 parts of propylene glycol and 0.1 part of SN Defoamer 247 (made by Sannopuko Kabushiki Kaisha). The resulting mixture was agitated at 500 r.p.m. for 10 minutes to give a white enamel (A-VII).

To 100 parts of the white enamel (A-VII) was added 3 parts of an emulsion of dibutyltin dilaurate (tin compound content 10%). The enamel was diluted with deionized water to a viscosity suitable for coating, air-sprayed onto a slate board and then aged at 20° C. for 10 days.

EXAMPLES 12 TO 14

White enamels (A-VIII) to (A-X) were obtained by adding 1.5 parts (Example 12), 3 parts (Example 13) or 6 parts (Example 14) of 3-aminopropyltriethoxysilane to 60 parts of the emulsion (A-2) in the same manner as in Example 11.

To 100 parts of each of these white enamels was added 5 parts of an emulsion of dibutyltin dilaurate (tin compound content 10%). Each of the enamels was diluted with deionized water to a viscosity suitable for coating, air-sprayed onto a slate board and then aged at 20° C. for 10 days.

EXAMPLE 15

White enamel (A-XI) was obtained by adding 3 parts of 3-aminopropyltriethoxysilane to 60 parts of the emulsion (A-3) in the same manner as in Example 11.

To 100 parts of this white enamel was added 5 parts of an emulsion of dibutyltin dilaurate (tin compound content 10%). The enamel was diluted with deionized water to a viscosity suitable for coating, air-sprayed onto a slate board and then aged at 20° C. for 10 days.

EXAMPLE 16

White enamel (A-XII) was obtained by adding 3 parts of N-(2-aminoethyl)-3-aminopropyltrimethoxysilane to 60 parts of the emulsion (A-1) in the same manner as in Example 11.

To 100 parts of this white enamel was added 3 parts of an emulsion of dibutyltin dilaurate (tin compound content 10%). The enamel was diluted with deionized water to a viscosity suitable for coating, air-sprayed onto a slate board and then aged at 20° C. for 10 days.

EXAMPLES 17 AND 18

White enamels (A-XIII) to (A-XIV) were obtained by adding 3 parts of A-1160 (product of Nippon Unicar Kabushiki Kaisha) (Example 17) or 3 parts of Y-9138 (product of Nippon Unicar Kabushiki Kaisha) to 60 parts of the emulsion (A-2) in the same manner as in Example 11.

To 100 parts of each of these white enamels was added 5 parts of an emulsion of dibutyltin dilaurate (tin compound content 10%). Each of the enamels was diluted with deionized water to a viscosity suitable for coating, air-sprayed onto a slate board and then aged at 20° C. for 10 days.

COMPARATIVE EXAMPLES 1 AND 4 TO 6

White enamel (A-XV) was obtained from the emulsion (A-4) in the same manner as in Example 1.

The white enamel (A-XV) was diluted with deionized water to a viscosity suitable for coating, and air-sprayed onto a slate board (Com. Ex. 1). Also, 3 parts of an emulsion of dibutyltin dilaurate (tin compound content 10%) was added to 100 parts of the white enamel (A-I) (Com. Ex. 4), and 5 parts of the emulsion of dibutyltin dilaurate was added to 100 parts of each of the white enamels (A-II) and (A-III) (Com. Exs. 5 and 6). Each of the enamels was diluted with deionized water to a viscosity suitable for coating, air-sprayed onto a slate board and then aged at 20° C. for 10 days.

COMPARATIVE EXAMPLE 2

Just before coating, the white enamel (A-XV) was incorporated with 3 parts of ESI 40 (product of Colcoat Co., Ltd., condensation product of partially hydrolyzed tetramethyl silicate) and 3 parts of an emulsion of dibutyltin dilaurate (tin compound content 10%) based on 100 parts of the enamel (A-XV). The enamel was diluted with deionized water to a viscosity suitable for coating, air-sprayed onto a slate board and aged at 20° C. for 10 days.

COMPARATIVE EXAMPLE 3

White enamel (A-XVI) was obtained by adding 3 parts of 3-aminopropyltriethoxysilane to 60 parts of the emulsion (A-4) in the same manner as in Example 11.

To 100 parts of this white enamel was added 3 parts of an emulsion of dibutyltin dilaurate (tin compound content 10%). The enamel was diluted with deionized water to a viscosity suitable for coating, air-sprayed onto a slate board and then aged at 20° C. for 10 days.

With respect to each of the coating films obtained in Examples 1 to 18 and Comparative Examples 1 to 6, stain resistance, hydrophilic property and hardness were examined. The methods for the measurement and estimation of the respective physical properties are as follows: The results are shown in Tables 2 to 5.

Stain Resistance

The lightness of a coating film represented by L*a*b* color specification system in the initial stage of the exposure was measured by a color difference colorimeter (Model CR300 made by Minolta Co., Ltd.), and the coating film was subjected to outdoor exposure for 3 months at Settsu-shi, Osaka with test specimen faced the correct south and inclined at 30° to the horizontal. The absolute value of the difference between lightness before the exposure and lightness after exposure (ΔL value) was obtained as a measure of stain. The smaller the value, the better the stain resistance. The larger the value, the more it is stained.

Hydrophilic property

Contact angle of water to a coating film subjected to outdoor exposure for 3 months at Settsu-shi, Osaka with specimen faced the correct south and inclined at 30° to the horizontal was measured by a contact angle measuring instrument (Model CA-S150 made by Kyowa Kaimen Kagaku Kabushiki Kaisha). The hydrophlilic property was estimated by the contact angle. The smaller the value, the higher the hydrophilic property.

Hardness

The hardness (Persoz hardness) of a coating film subjected to outdoor exposure for 3 months at Settsu-shi, Osake with specimen faced the correct south and inclined at 30° to the horizontal was measured by a pendulum hardness meter (PERSOZ hardness meter made by Erichsen Kabushiki Kaisha). The larger the value, the higher the hardness.

TABLE 2

|  | Ex. 1 | Ex. 2 | Ex. 3 | Ex. 4 | Ex. 5 | Ex. 6 | Ex. 7 |
|---|---|---|---|---|---|---|---|
| Stain resistance (ΔL) | 4.5 | 3.7 | 2.9 | 2.2 | 1.5 | 1.7 | 4.8 |
| Contact angle (degree) | 60 | 55 | 50 | 42 | 36 | 38 | 63 |
| Persoz hardness | 120 | 110 | 122 | 118 | 115 | 145 | 125 |

TABLE 3

|  | Ex. 8 | Ex. 9 | Ex. 10 | Ex. 11 | Ex. 12 | Ex. 13 |
|---|---|---|---|---|---|---|
| Stain resistance (ΔL) | 3.3 | 3.4 | 2.8 | 3.0 | 4.7 | 2.7 |
| Contact angle (degree) | 54 | 53 | 51 | 50 | 62 | 48 |
| Persoz hardness | 124 | 118 | 146 | 125 | 120 | 130 |

TABLE 4

|  | Ex. 14 | Ex. 15 | Ex. 16 | Ex. 17 | Ex. 18 |
|---|---|---|---|---|---|
| Stain resistance (ΔL) | 2.3 | 2.5 | 3.2 | 3.5 | 3.0 |
| Contact angle (degree) | 42 | 45 | 54 | 56 | 50 |
| Persoz hardness | 140 | 152 | 143 | 133 | 136 |

TABLE 5

|  | Com. Ex. 1 | Com. Ex. 2 | Com. Ex. 3 | Com. Ex. 4 | Com. Ex. 5 | Com. Ex. 6 |
|---|---|---|---|---|---|---|
| Stain resistance (ΔL) | 13.6 | 5.5 | 5.9 | 7.3 | 6.8 | 5.4 |
| Contact angle (degree) | 84 | 65 | 68 | 72 | 70 | 63 |
| Persoz hardness | 52 | 76 | 90 | 102 | 110 | 132 |

INDUSTRIAL APPLICABILITY

The resin composition for water-based paints of the present invention forms coating films having an excellent stain resistance in addition to excellent weatherability and durability on surfaces of materials to be coated when applying to the materials. Also, coating films having an excellent stain resistance against outdoor exposure are formed on surfaces of materials by the process for forming coating films of the present invention, that is to say, by coating the resin composition to the materials after incorporating a silicon compound represented by the formula (I) and/or its partial hydrolysis condensation product and/or a silicon compound having in one molecule at least one amino group and/or its derivative and at least one hydrolyzable silyl group, and a curing catalyst into the composition.

We claim:

1. A resin composition suitable as water-based paints, which comprises:

(A) 100 parts by weight of an emulsion of a polymer obtained by copolymerizing a vinyl monomer containing a silyl group of the formula (I):

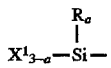

(I)

wherein $R^1$ is the same or different and each is an alkyl group having 1 to 10 carbon atoms, an aryl group having 6 to 10 carbon atoms or an aralkyl group having 7 to 10 carbon atoms, $X^1$ is at least one group selected from the group consisting of a halogen atom, an alkoxyl group, a hydroxyl group, an acyloxy group, an aminooxy group, a phenoxy group, a thioalkoxy group and an amino group, and a is an integer of 0 to 2, with other vinyl monomer, 1 to 70 parts by weight of (B) a silicon compound of the formula (II):

$(R^2O)_{4-b}$—Si—$R^3_b$ (II)

wherein $R^2$ is the same or different and each is an alkyl group having 1 to 10 carbon atoms, an aryl group having 6 to 10 carbon atoms or an aralkyl group having 7 to 10 carbon atoms, $R^3$ is the same or different and each is an alkyl group having 1 to 10 carbon atoms, an aryl group having 6 to 10 carbon atoms, an aralkyl group having 7 to 10 carbon atoms or an alkoxyl group having 1 to 10 carbon atoms, and b is an integer of 0 to 2, and/or its partial hydrolysis condensation product, and/or (C) a silicon compound having at least one amino group and/or its derivative and at least one hydrolyzable silyl group in a molecule, and (D) 0 to 20 parts by weight of a curing catalyst.

2. The composition of claim 1, wherein said polymer containing a silyl group represented by the formula (I) is an emulsion-polymerized copolymer obtained by copolymerization of a polymerization component comprising 1 to 30 parts by weight of an alkoxysilyl group-containing vinyl monomer, 0.1 to 10 parts by weight of a hydrophilic vinyl monomer having a polyoxyethylene chain and the balance of other vinyl monomers using an anionic surface active agent having a polyoxyethylene chain.

3. The composition of claim 1, wherein said polymer containing a silyl group represented by the formula (I) in said component (A) is a polymer obtained by copolymerization using at least 60 parts by weight of one or more kinds of alkyl methacrylates having an alkyl group with at least 4 carbon atoms and cycloalkyl methacrylates having a cycloalkyl group with at least 4 carbon atoms based on 100 parts by weight of the total amount of polymerizable components.

4. The composition of claim 1, wherein said silicon compound or its partial hydrolysis condensation product in said component (B) is tetramethoxysilane, tetraethoxysilane, tetra-n-propoxysilane, tetraisopropoxysilane, tetra-n-butoxysilane, tetraisobutoxysilane, tetra-t-butoxysilane, or their partial hydrolysis condensation products or their admixtures.

5. The composition of claim 1, wherein said silicon compound in said component (C) is 3-aminopropyltrimethoxysilane, 3-aminopropyltriethoxysilane, 3-aminopropylmethyldimethoxysilane, N-methyl-3-aminopropyltrimethoxysilane, N-phenyl-3-aminopropyltrimethoxysilane, N,N-dimethyl-3-aminopropyltrimethoxysilane, N-(2-aminoethyl)-3-aminopropyltrimethoxysilane, N-(2-aminoethyl)-3-aminopropyltriethoxysilane, N-[2-(N'-methyl)aminoethyl]-3-aminopropyltrimethoxysilane, or N-[2-(N',N'-dimethyl) aminoethyl]-3-aminopropyltrimethoxysilane.

6. The composition of claim 1, wherein said curing catalyst (D) is an organoaluminum or organotin compound emulsified by a surface active agent composed mainly of an alkyl ether surface active agent.

7. The composition of claim 1, wherein said component (D) is an acid phosphoric acid ester, a mixture of an organic carboxylic acid and an organic amine, or a reaction product of an organic carboxylic acid and an organic amine.

8. A process for forming a coating film having an excellent stain resistance comprising coating the resin composition of claim 1 to materials to be coated, in which (A) an emulsion of a polymer containing a silyl group represented by the formula (I) is incorporated with, per 100 parts by weight of said emulsion (A), 1 to 70 parts by weight of (B) a silicon compound represented by the formula (II) and/or its partial hydrolysis condensation product and/or (C) a silicon compound having at least one amino group and/or its derivative and at least one hydrolyzable silyl group in one molecule, and (D) 0 to 20 parts by weight of a curing catalyst, and is coated onto materials to be coated.